United States Patent
Drobietz et al.

(10) Patent No.: US 8,430,638 B2
(45) Date of Patent: Apr. 30, 2013

(54) NOISE REDUCER FOR ROTOR BLADE IN WIND TURBINE

(75) Inventors: Roger Drobietz, Rheine (DE); Ariane Frere, Brussels (BE); Andreas Herrig, Rheine (DE); Wendy Wen-Ling Lin, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/329,426

(22) Filed: Dec. 19, 2011

(65) Prior Publication Data

US 2012/0134837 A1    May 31, 2012

(51) Int. Cl.
*F03D 11/00*    (2006.01)

(52) U.S. Cl.
USPC ......... 416/132 B; 416/228; 416/237; 416/240

(58) Field of Classification Search ................... 415/119, 415/914; 416/62, 131, 132 R, 132 A, 132 B, 416/228, 229 R, 230, 231 R, 231 B, 235, 416/236 R, 237, 240, 501; 181/175, 207–209, 181/233; 244/200, 200.1; 15/159.1, 160, 15/183, 246.5, 246, 387
See application file for complete search history.

(56) References Cited

U.S. PATENT DOCUMENTS

| | | | |
|---|---|---|---|
| 175,355 A | 3/1876 | King | |
| 573,562 A | 12/1896 | Wittram | |
| 1,861,065 A | 5/1932 | Poot | |
| 19,412 A | 1/1935 | Zaparka | |
| RE19,412 E | 1/1935 | Zaparka | |
| 2,071,012 A | 2/1937 | Adams | |
| 2,225,312 A * | 12/1940 | Mason | 181/175 |
| 2,238,749 A | 4/1941 | Peltier | |
| D131,271 S | 2/1942 | Colura | |
| 2,312,219 A | 4/1943 | Sensenich | |
| 2,469,167 A * | 5/1949 | Little | 181/208 |
| 2,899,128 A | 8/1959 | Vaghi | |
| 4,089,618 A | 5/1978 | Patel | |
| 4,204,629 A * | 5/1980 | Bridges | 277/355 |

(Continued)

FOREIGN PATENT DOCUMENTS

| | | |
|---|---|---|
| DE | 102006043462 | 3/2008 |
| EP | 0 652 367 | 5/1995 |

(Continued)

OTHER PUBLICATIONS

Co-pending U.S. Appl. No. 13/149,513, filed May 31, 2011.

(Continued)

*Primary Examiner* — Christopher Verdier
(74) *Attorney, Agent, or Firm* — Dority & Manning, P.A.

(57) ABSTRACT

A noise reducer for a rotor blade of a wind turbine and a rotor blade assembly are disclosed. The rotor blade assembly includes a rotor blade having exterior surfaces defining a pressure side, a suction side, a leading edge and a trailing edge each extending between a tip and a root. The rotor blade further defines a span and a chord. The rotor blade assembly further includes a noise reducer configured on the rotor blade. The noise reducer includes a plurality of rods each having a body extending between a first end and a second end. The body of each of the plurality of rods contacts and extends parallel to the body of a neighboring rod of the plurality of rods when the noise reducer is in a stable position.

17 Claims, 5 Drawing Sheets

U.S. PATENT DOCUMENTS

| | | | |
|---|---|---|---|
| 4,618,313 A | | 10/1986 | Mosiewicz |
| 4,720,244 A | | 1/1988 | Kluppel et al. |
| 4,962,826 A | * | 10/1990 | House .......................... 181/207 |
| 5,088,665 A | | 2/1992 | Vijgen et al. |
| 5,320,491 A | | 6/1994 | Coleman et al. |
| 5,328,329 A | | 7/1994 | Monroe |
| 5,522,266 A | | 6/1996 | Nicholson et al. |
| 5,533,865 A | | 7/1996 | Dassen et al. |
| 5,819,357 A | * | 10/1998 | Gould .......................... 15/182 |
| 6,352,601 B1 | | 3/2002 | Ray |
| 6,491,260 B2 | | 12/2002 | Borchers et al. |
| 6,729,846 B1 | | 5/2004 | Wobben |
| 6,733,240 B2 | | 5/2004 | Gliebe |
| 6,779,978 B2 | | 8/2004 | Camargo Do Amarante |
| 6,789,769 B2 | | 9/2004 | Mau et al. |
| 6,830,436 B2 | | 12/2004 | Shibata et al. |
| 7,059,833 B2 | | 6/2006 | Stiesdal et al. |
| 7,328,770 B2 | | 2/2008 | Owens et al. |
| 7,351,041 B2 | | 4/2008 | Uselton et al. |
| 7,413,408 B1 | | 8/2008 | Tafoya |
| 7,458,777 B2 | | 12/2008 | Herr |
| 7,632,068 B2 | | 12/2009 | Bak et al. |
| 7,637,721 B2 | | 12/2009 | Driver et al. |
| 7,740,206 B2 | | 6/2010 | Eaton et al. |
| 7,976,283 B2 | | 7/2011 | Huck |
| 2001/0008032 A1 | * | 7/2001 | Llewellyn-Jones et al. . 15/167.1 |
| 2004/0253114 A1 | | 12/2004 | Gunneskov et al. |
| 2007/0025858 A1 | | 2/2007 | Driver et al. |
| 2007/0041823 A1 | | 2/2007 | Miller |
| 2007/0065290 A1 | | 3/2007 | Herr |
| 2007/0077150 A1 | | 4/2007 | Llorente Gonzalez |
| 2007/0294848 A1 | * | 12/2007 | Dumler .......................... 15/160 |
| 2008/0001363 A1 | * | 1/2008 | Bhate .......................... 277/355 |
| 2008/0061192 A1 | | 3/2008 | Sullivan |
| 2008/0080977 A1 | | 4/2008 | Bonnet |
| 2008/0107540 A1 | | 5/2008 | Bonnet |
| 2008/0166241 A1 | | 7/2008 | Herr et al. |
| 2008/0187442 A1 | | 8/2008 | Standish et al. |
| 2008/0298967 A1 | | 12/2008 | Matesanz Gil et al. |
| 2009/0016891 A1 | | 1/2009 | Parsania et al. |
| 2009/0074585 A1 | | 3/2009 | Koegler et al. |
| 2009/0097976 A1 | | 4/2009 | Driver et al. |
| 2009/0104038 A1 | | 4/2009 | Grabau |
| 2009/0126131 A1 | * | 5/2009 | Delaere et al. .................. 15/21.1 |
| 2009/0274559 A1 | | 11/2009 | Petsche et al. |
| 2010/0028161 A1 | | 2/2010 | Vronsky et al. |
| 2010/0068042 A1 | * | 3/2010 | Bruck et al. ............... 415/174.2 |
| 2010/0101037 A1 | * | 4/2010 | Gross et al. .................. 15/167.1 |
| 2010/0104436 A1 | | 4/2010 | Herr et al. |
| 2010/0329879 A1 | | 12/2010 | Presz, Jr. et al. |
| 2011/0018282 A1 | | 1/2011 | Hayashi et al. |
| 2011/0042524 A1 | | 2/2011 | Hemmelgarn et al. |
| 2011/0142637 A1 | | 6/2011 | Riddell et al. |
| 2011/0223030 A1 | | 9/2011 | Huck et al. |

FOREIGN PATENT DOCUMENTS

| | | |
|---|---|---|
| EP | 2028366 | 2/2009 |
| EP | 2053240 | 4/2009 |
| EP | 2138714 | 12/2009 |
| EP | 2216545 | 8/2010 |
| EP | 2253838 | 11/2010 |
| EP | 2270312 | 1/2011 |
| JP | 2000120524 | 4/2000 |
| JP | 2003254225 | 9/2003 |
| WO | WO 98/21091 | 5/1998 |
| WO | WO2004/088130 | 10/2004 |
| WO | WO2008035149 | 3/2008 |
| WO | WO2008/113349 | 9/2008 |
| WO | WO 2008/131800 | 11/2008 |
| WO | WO2009/025549 | 2/2009 |

OTHER PUBLICATIONS

Co-pending U.S. Appl. No. 12/861,145, filed Aug. 23, 2010.

Co-pending U.S. Appl. No. 12/946,259, filed Nov. 15, 2010.

Co-pending U.S. Appl. No. 12/939,531, filed Nov. 4, 2010.

Co-pending U.S. Appl. No. 12/943,135, filed Nov. 10, 2010.

Co-pending U.S. Appl. No. 12/970,119, filed Dec. 16, 2010.

Risoe National Laboratory for Sustainable Energy, "Controllable Rubber Trailing Edge Flap May Ease Stress on Wind Turbine Blades". Renewable Energy World.com, pp. 1-3, Feb. 17, 2010.

Risoe National Laboratory for Sustainable Energy, "Successful Wind Tunnel Test of Controllable Rubber Trailing Edge Flap for Wind Turbine Blades". Science Daily, pp. 1-2, Feb. 19, 2010.

Risoe National Laboratory for Sustainable Energy, The Technical University of Denmark, "Flexible Trailing Edge Flap for Blades to Make Wind PPower Cheaper". Science Daily, pp. 1-2, Apr. 7, 2011.

Risoe National Laboratory for Sustainable Energy, The Technical University of Denmark, "Flexible Trailing Edge Flap for Blades to Make Wind Power Cheaper". Science Daily, pp. 1-2, Apr. 7, 2011.

* cited by examiner

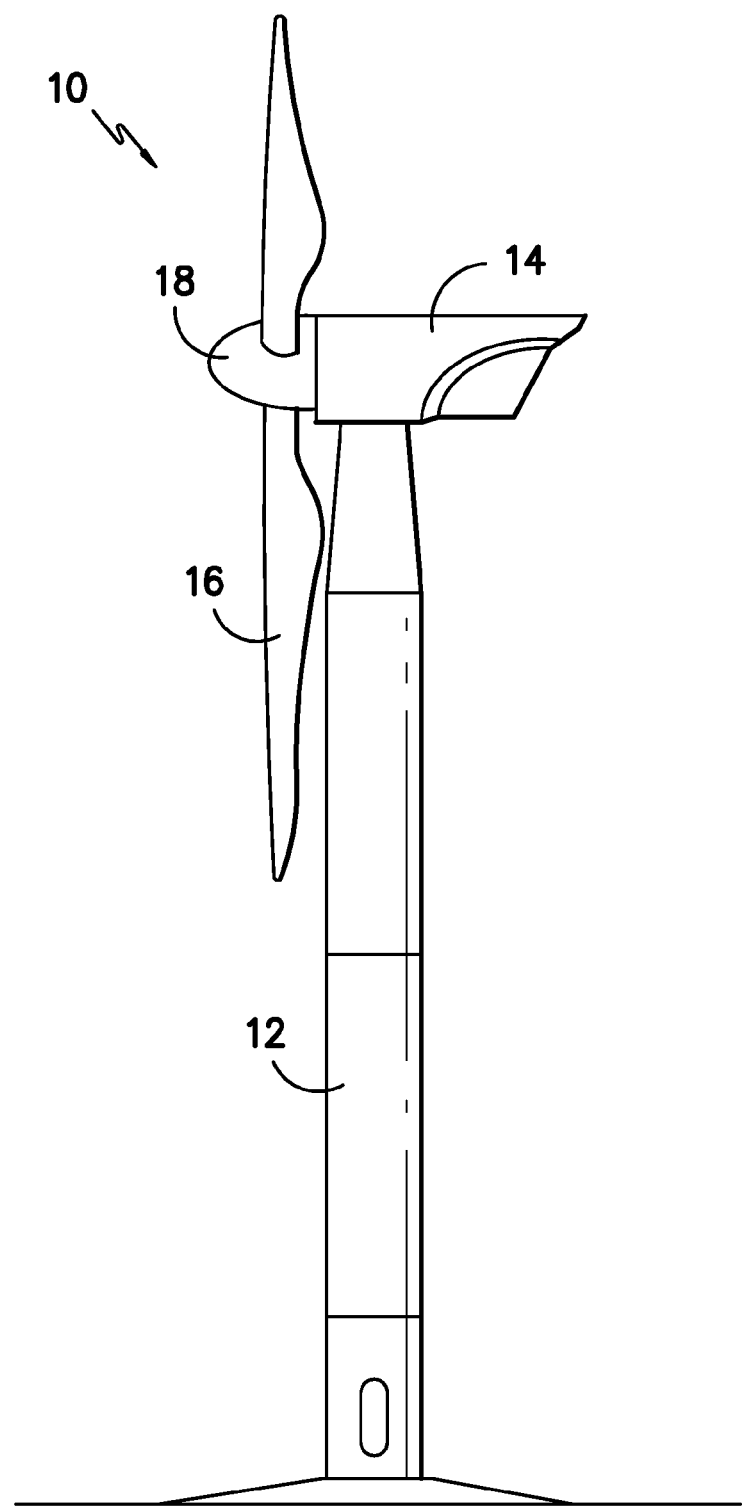
FIG. -1-
PRIOR ART

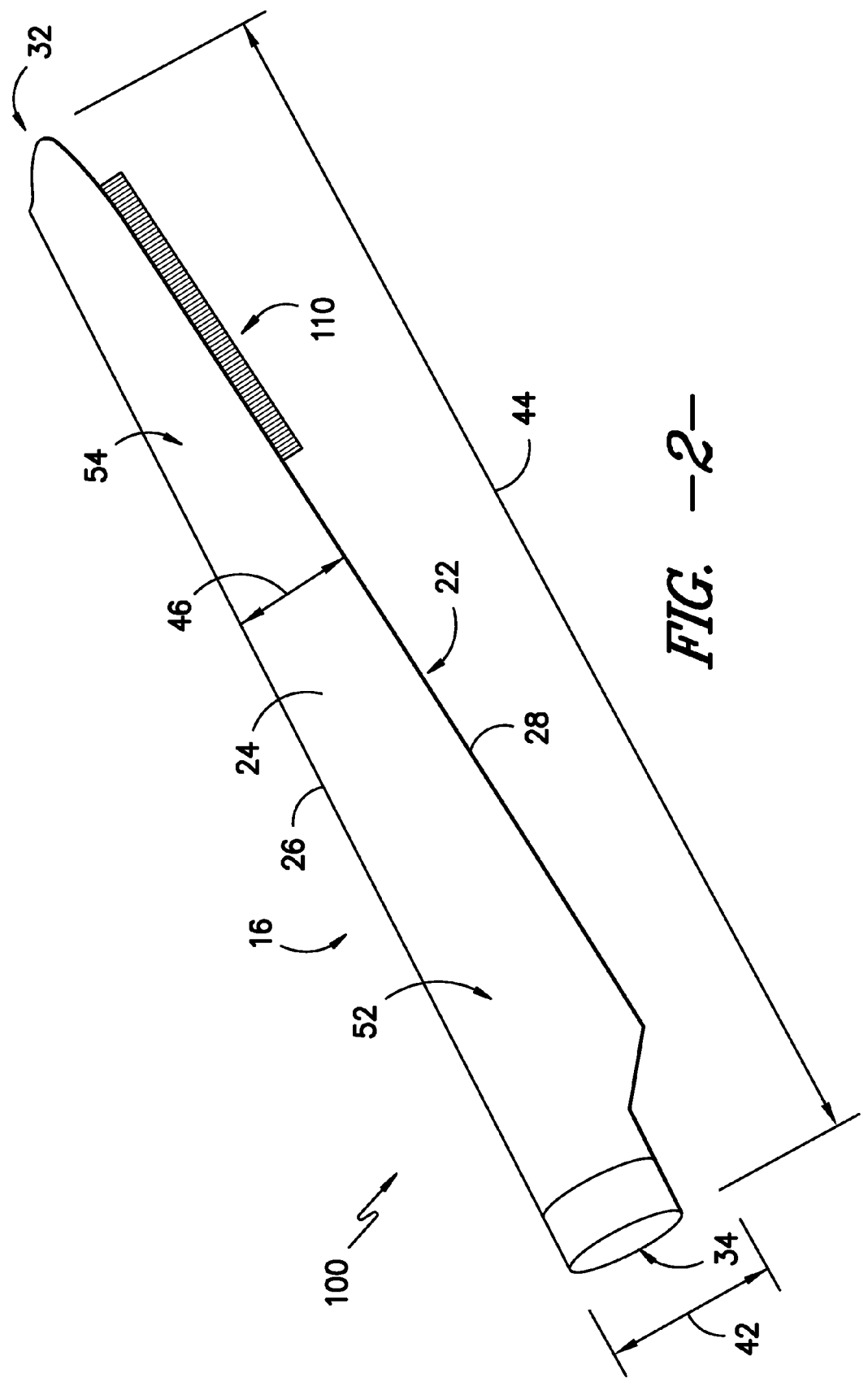
FIG. -2-

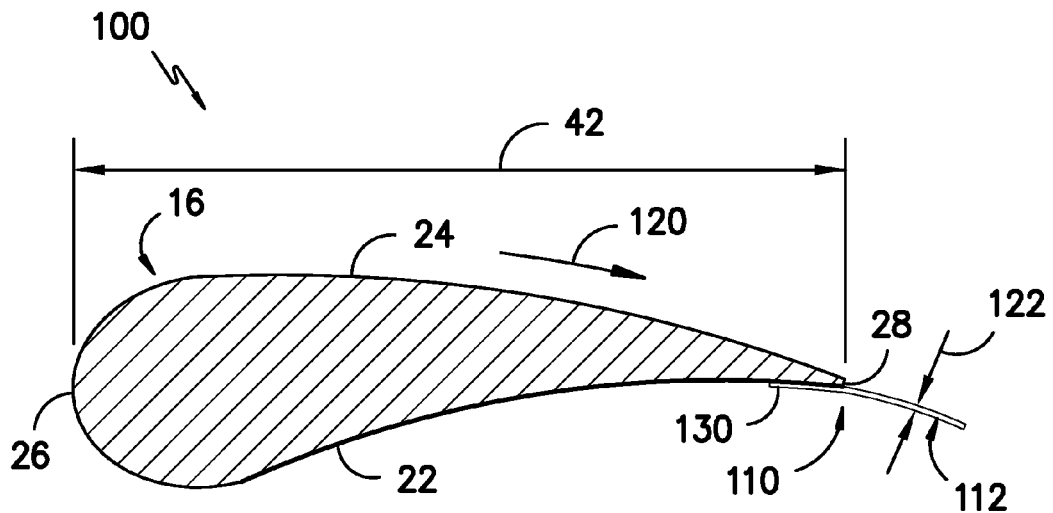
FIG. -3-
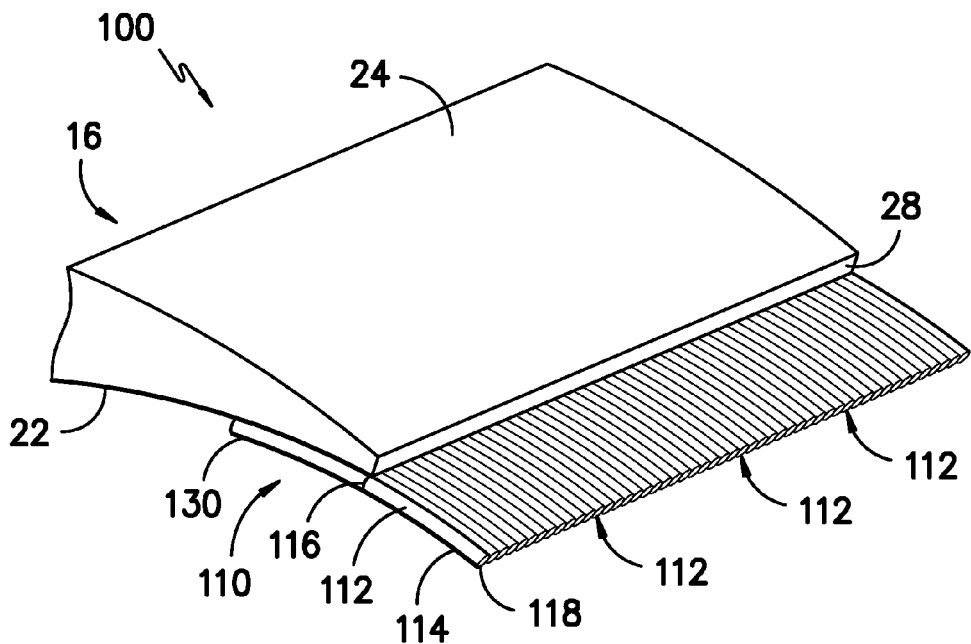
FIG. -4-

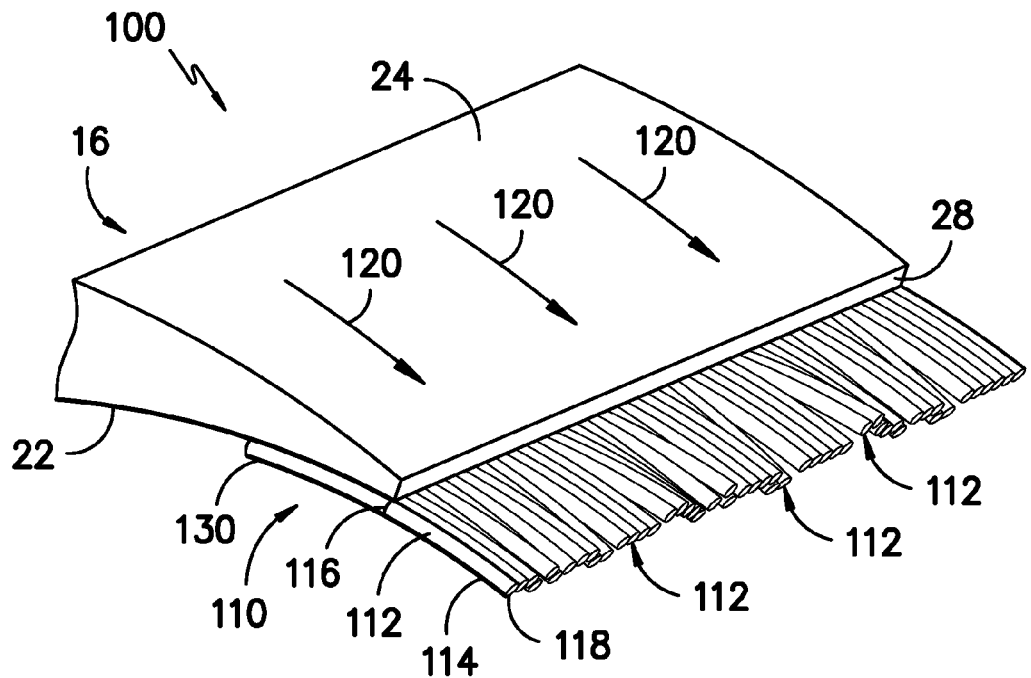
FIG. -5-
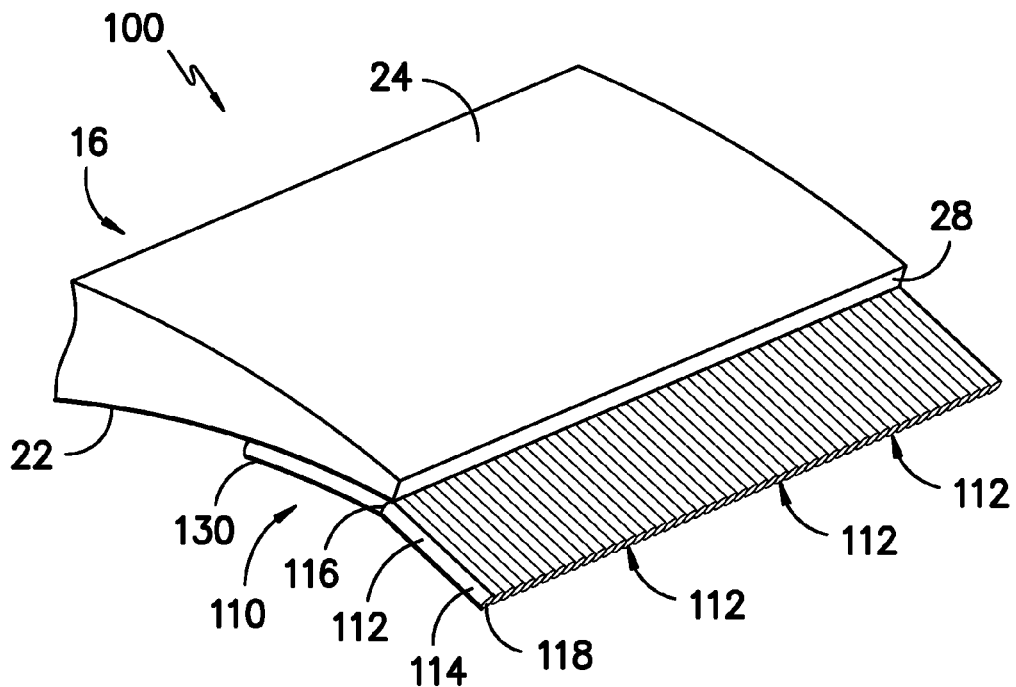
FIG. -6-

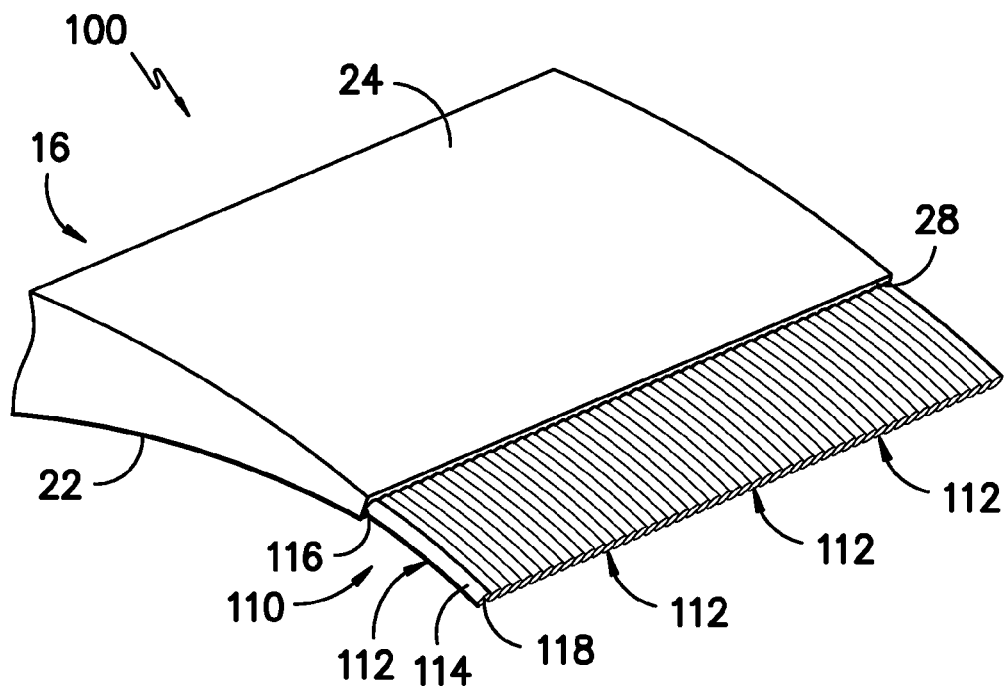
FIG. -7-
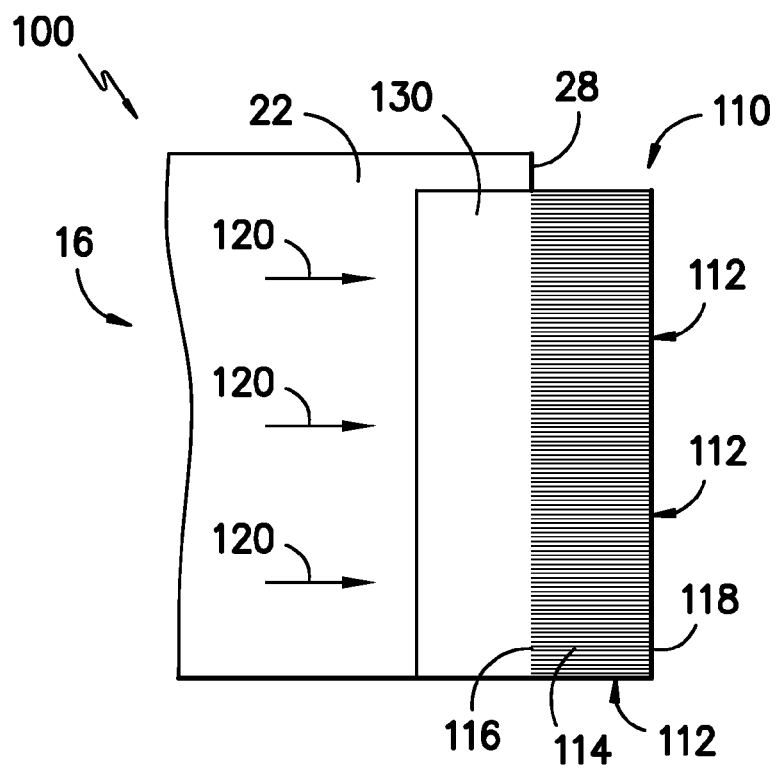
FIG. -8-

NOISE REDUCER FOR ROTOR BLADE IN WIND TURBINE

FIELD OF THE INVENTION

The present disclosure relates in general to wind turbine rotor blades, and more particularly to noise reducers configured on the rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many cases, various components are attached to the rotor blades of wind turbines to perform various functions during operation of the wind turbines. These components may frequently be attached adjacent the trailing edges of the rotor blades. For example, noise reducers may be attached adjacent the trailing edges of the rotor blades to reduce the noise and increase the efficiency associated with the rotor blades. However, typical prior art noise reducers have a variety of disadvantages, and may not adequately reduce the noise associated with typical rotor blades. For example, many currently known noise reducers include a plurality of serrations. The serrations are designed to reduce noise when the wind flow over the noise reducer flows in a certain direction. If the direction of wind flow is altered, however, the effectiveness of the serrations in reducing the noise may be reduced. Other currently known noise reducers include bristles. The bristles are spaced apart from each other, and are also designed to reduce noise. However, typical bristles are relatively flexible, and this flexibility combined with the spacing between the bristles may result in a noise reducer that is effectively almost completely permeable during operation of an associated wind turbine. This permeability may cause drastic changes in boundary conditions between a rotor blade and associated noise reducer, thus reducing the effectiveness of the noise reducer in reducing noise.

Thus, an improved noise reducer for a rotor blade would be desired. For example, a noise reducer with improved noise reduction features would be advantageous. Specifically, a noise reducer with noise reduction features that allow for smoother boundary condition transitions would be desired.

BRIEF DESCRIPTION OF THE INVENTION

Aspects and advantages of the invention will be set forth in part in the following description, or may be obvious from the description, or may be learned through practice of the invention.

In one embodiment, a rotor blade assembly is disclosed. The rotor blade assembly includes a rotor blade having exterior surfaces defining a pressure side, a suction side, a leading edge and a trailing edge each extending between a tip and a root. The rotor blade further defines a span and a chord. The rotor blade assembly further includes a noise reducer configured on the rotor blade. The noise reducer includes a plurality of rods each having a body extending between a first end and a second end. The body of each of the plurality of rods contacts and extends parallel to the body of a neighboring rod of the plurality of rods when the noise reducer is in a stable position.

In another embodiment, a noise reducer for a rotor blade of a wind turbine is disclosed. The noise reducer includes a plurality of rods each having a body extending between a first end and a second end. The body of each of the plurality of rods contacts and extends parallel to the body of a neighboring rod of the plurality of rods when the noise reducer is in a stable position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a side view of a prior art wind turbine according to one embodiment of the present disclosure;

FIG. 2 is a top view of a rotor blade assembly according to one embodiment of the present disclosure;

FIG. 3 is a cross-sectional view of a rotor blade assembly according to one embodiment of the present disclosure;

FIG. 4 is a perspective view of a portion of a rotor blade assembly in a stable position according to one embodiment of the present disclosure;

FIG. 5 is a perspective view of a portion of the rotor blade assembly of FIG. 4 in a operating position; and, FIG. 6 is a perspective view of a portion of a rotor blade assembly in a stable position according to another embodiment of the present disclosure;

FIG. 7 is a perspective view of a portion of a rotor blade assembly in a stable position according to another embodiment of the present disclosure; and, FIG. 8 is a bottom view of a portion of a rotor blade assembly according to one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIG. 2, a rotor blade 16 according to the present disclosure may include exterior surfaces defining a pressure side 22 (see FIGS. 3 through 8) and a suction side 24 extending between a leading edge 26 and a trailing edge 28, and may extend from a blade tip 32 to a blade root 34. The exterior surfaces may be generally aerodynamic surfaces having generally aerodynamic contours, as is generally known in the art.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define chord 42 and a span 44. As shown in FIG. 2, the chord 42 may vary throughout the span 44 of the rotor blade 16. Thus, a local chord may be defined for the rotor blade 16 at any point on the rotor blade 16 along the span 44.

Additionally, the rotor blade 16 may define an inner board area 52 and an outer board area 54. The inner board area 52 may be a span-wise portion of the rotor blade 16 extending from the root 34. For example, the inner board area 52 may, in some embodiments, include approximately 33%, 40%, 50%, 60%, 67%, or any percentage or range of percentages therebetween, or any other suitable percentage or range of percentages, of the span 44 from the root 34. The outer board area 54 may be a span-wise portion of the rotor blade 16 extending from the tip 32, and may in some embodiments include the remaining portion of the rotor blade 16 between the inner board area 52 and the tip 32. Additionally or alternatively, the outer board area 54 may, in some embodiments, include approximately 33%, 40%, 50%, 60%, 67%, or any percentage or range of percentages therebetween, or any other suitable percentage or range of percentages, of the span 44 from the tip 32.

As illustrated in FIGS. 2 through 8, the present disclosure may further be directed to one or more rotor blade assemblies 100. A rotor blade assembly 100 according to the present disclosure includes a rotor blade 16 and one or more noise reducers 110. In general, a noise reducer 110 may be configured on a surface of the rotor blade 16, and may reduce the aerodynamic noise being emitted from the rotor blade 16 during operation of the wind turbine 10 and/or increase the efficiency of the rotor blade 16. In an exemplary embodiment of the present disclosure, the noise reducer 110 may be configured on a surface of the rotor blade 16 adjacent the trailing edge 28 of the rotor blade 16. Alternatively, the noise reducer 110 may be configured on a surface of the rotor blade 16 adjacent the leading edge 26 of the rotor blade 16, or adjacent the tip 32 or the root 34 of the rotor blade 16, or at any other suitable position on the rotor blade 16.

In exemplary embodiments, as shown in FIGS. 2 through 6 and 8, the noise reducer 110 may configured on, such as mounted to, the pressure side 22 of the rotor blade 16. In alternative embodiments, the noise reducer 110 may be configured on, such as mounted to, the suction side 24. In yet other alternative embodiments, the noise reducer 110 may be configured on the rotor blade 16 on the trailing edge 28 or leading edge 26, such as between the pressure side 22 and the suction side 24.

For example, as shown in FIG. 7, the noise reducer 110 may be configured on the trailing edge 28 between the pressure side 22 and the suction side 24. In some of these embodiments, the rotor blade 16 may be formed from one or more shell portions. For example, one shell portion may include the pressure side 22 and extend between the leading edge 26 and the trailing edge 28, while another shell portion may include the suction side 24 and extend between the leading edge 26 and the trailing edge 28. The noise reducer 110 may be mounted between these shell portions such that a portion of the noise reducer 110 is disposed in the interior of the rotor blade 16, while another portion extends from the rotor blade 16. Alternatively, the noise reducer 110 may extend through a shell portion of the rotor blade 16 at a desired location, such as at the trailing edge 28. In further alternative embodiments, the noise reducer 110 may be mounted directly to the exterior of the rotor blade 16 between the pressure side 22 and the suction side 24 through the use of, for example, a suitable adhesive or suitable mechanical fasteners. For example, in exemplary embodiments, the noise reducer 110 may be mounted directly to the trailing edge 28. In still further exemplary embodiments, as shown in FIG. 7, the noise reducer 110 may be integral with the rotor blade 16, such that they are formed together from the same materials.

As shown in FIGS. 2 through 8, a noise reducer 110 according to the present disclosure includes a plurality of rods 112. As discussed below, the rods 112 may have an advantageous arrangement with respect to each other and respect to a rotor blade 16 which facilitate improved noise reduction characteristics. Further, each of the plurality of rods 112 may advantageously be formed from a suitable material and have a suitable width or diameter that provides a suitable stiffness for the rod 112. The arrangement of the rods 112, along with their material and size, may allow for smoother boundary condition transitions for wind flowing past a rotor blade assembly 100, thus advantageously reducing the noise associated with the rotor blade assembly 100 during operation of a wind turbine 10.

As shown, each of the plurality of rods 112 has a body 114 extending between a first end 116 and a second end 118. The body 114 of a rod 112 may have any suitable shape. For example, a body 114 may be generally cylindrical, having a circular or oval-shaped cross-sectional shape, or may be generally cube-shaped, having a square or rectangular cross-sectional shape, or may have any other suitable shape and cross-sectional shape. Further, in exemplary embodiments, the cross-sectional shape and size of the body 114 may be constant between the first end 116 and the second end 118. In alternative embodiments, however, the cross-sectional shape and size of the body 114 may taper from the first end 116 towards the second end 118 or from the second end 118 towards the first end 116.

As shown, the body 114 of each of the plurality of rods 112 in a noise reducer 110 may contact the body 114 of one or more neighboring rods 112 when the noise reducer 110 is in a stable position. A stable position is a position wherein the noise reducer 110, and rods 112 thereof, is not being affected by any external forces such as by the force of wind flowing past the rotor blade 16. Thus, for example, the stable position may be the position that the noise reducer 110 is in before or after operation of the rotor blade 16 and wind turbine 10, such as when the rotor blade 16 and wind turbine 10 are not operating. In the stable position, each rod 112 of a noise reducer 110 contacts at least one neighboring rod 112, such that there is no space between the rods 112 at the contact points. Such contact in exemplary embodiments may occur throughout the entire body 114 of each rod 112 between the first end 116 and second end 118. Further, in exemplary embodiments, the rods 112 of a noise reducer 110 are arranged in a single row, with each rod 112 contacting the neighboring rods when in a stable position.

As further shown, in exemplary embodiments, each of the plurality of rods 112 is generally parallel to one or more neighboring rods 112. Thus, as shown, the body 114 of each rod 112 may extend parallel to the neighboring rods 112 between the first end 116 and second end 118. Such parallelism may be evident in a top or bottom view, as shown in FIG. 8 and/or in side cross-sectional view, as shown in FIG. 3.

The rods 112 of a noise reducer 110 according to the present disclosure may in some embodiments further each be approximately aligned with a local flow direction for the rotor blade 16. For example, a local flow direction may be defined at the span-wise location of each of the rods 112 with respect to the rotor blade 16. The local flow direction may be the direction of flow at that span-wise location of wind past the rotor blade 16 during operation of the wind turbine 10 and rotor blade 16. Various local flow directions 120 are shown in FIGS. 3, 5 and 8. In exemplary embodiments, each rod 112 may be aligned with the respective local flow direction for the span-wise location of the rod 112, such that the rod 112 in the stable position and/or in an operating position is generally parallel to that local flow direction. An operating position is a position that a noise reducer 110, and the rods 112 thereof, may be in during operation of the wind turbine 10 and rotor blade 16, such that wind passing over the rotor blade 16 may be interacting with the noise reducer 110. Such parallelism may be evident in a top or bottom view, as shown in FIG. 8 and/or in side cross-sectional view, as shown in FIG. 3.

Each of the plurality of rods 112, such as the body 114 thereof, may further extend between the first end 116 and second end 118 along any suitable path. For example, in some embodiments as shown in FIGS. 3 through 5 and 7, each of the plurality of rods 112 may be generally curvilinear, thus extending between a first end 116 and a second end 118 along a generally curvilinear path. A side view of each of the plurality of rods 112 may thus in these views be generally curvilinear, as shown. In other embodiments as shown in FIG. 6, each of the plurality of rods 112 may be generally linear, thus extending between a first end 116 and a second end 118 along a generally linear path. A side view of each of the plurality of rods 112 may thus in these views be generally linear, as shown.

Each of the plurality of rods 112 may be formed of a suitable material having a suitable stiffness that provides the noise reducer 110 and rotor blade assembly 100 with improved noise reduction qualities, such as by improving boundary condition transitions for wind between the rotor blade 16 and associated noise reducer. For example, each rod 112 may have a modulus of elasticity. In exemplary embodiments, each rod 112 may be formed from a material having a modulus of elasticity of greater than or equal to approximately $2.5 \times 10^3$ N/mm$^2$, greater than or equal to approximately $5 \times 10^3$ N/mm$^2$, greater than or equal to approximately $10 \times 10^3$ N/mm$^2$, greater than or equal to approximately $20 \times 10^3$ N/mm$^2$, greater than or equal to approximately $30 \times 10^3$ N/mm$^2$, greater than or equal to approximately $40 \times 10^3$ N/mm$^2$, greater than or equal to approximately $50 \times 10^3$ N/mm$^2$, greater than or equal to approximately $100 \times 10^3$ N/mm$^2$, greater than or equal to approximately $200 \times 10^3$ N/mm$^2$, or up to approximately $200 \times 10^3$ N/mm$^2$.

In some embodiments, for example, each of the plurality of rods 112 may be formed from a suitable fiber-reinforced plastic ("FRP") material. The fiber may be, for example, glass, basalt, carbon, polyimide, or polyethylene, such as ultra-high molecular weight polyethylene, or any other suitable fiber. The plastic may be, for example, epoxy, vinylester, polypropylene, polybutylene terephthalate, polyethylene, or polyamide, or any other suitable plastic material. In other embodiments, each of the plurality of rods 112 may be formed from a suitable polyamide or polypropylene material. In still other embodiments, each of the plurality of rods 112 may be formed from a suitable metal or metal alloy. It should be understood, however, that the present disclosure is not limited to the above-disclosed materials or material properties, and rather that any suitable materials having any suitable material properties are within the scope and spirit of the present disclosure.

Each of the plurality of rods 112 may further have a suitable size that provides the noise reducer 110 and rotor blade assembly 100 with improved noise reduction qualities, such as by improving boundary condition transitions for wind flowing past the associated noise reducer 110 of a rotor blade 16. For example, each of the plurality of rods 112 may in some embodiments have a diameter 122. It should be understood that the term "diameter" may be the diameter of a rod 112 having a circular cross-section, but may also be the major diameter of a rod 112 having an oval cross-section or the width of a rod 112 having a square, rectangular, or other suitable cross-section. In exemplary embodiments, the diameter 122 of each of the plurality of rods 112 may be less than or equal to approximately 3.0 mm, less than or equal to approximately 2.5 mm, less than or equal to approximately 2.0 mm, less than or equal to approximately 1.5 mm, or less than or equal to approximately 1.0 mm.

As discussed, the arrangement of the rods 112, along with their material and size, may allow for smoother boundary condition transitions for wind flowing past a rotor blade assembly 100, thus advantageously reducing the noise associated with the rotor blade assembly 100 during operation of a wind turbine 10. For example, the arrangement of rods 112 such that they are generally parallel and in contact with one another provides the noise reducer 110 with a generally closed surface, such that there are few or no gaps between the various rods 112, when in a stable position. Further, the material and size of the rods 112 of a noise reducer 110 according to the present disclosure may make the rods 112 relatively stiffer than previously known noise reducers. Thus, during operation of the wind turbine when the noise reducer 110 is in an operating position, as shown in FIG. 5, deflection of the rods 112 may be relatively minor such that the effective permeability of the noise reducer 110 for wind flowing past it may be relatively lessened, and may be less than effectively 100%. Effective permeability may thus be a function of material, size, and arrangement. This reduced permeability due to the arrangement, material, and size of the rods 112 allows for a smoother wind flow past the rotor blade assembly 100, and specifically past the associated noise reducer 110 of a rotor blade 16. Specifically, the boundary condition transition for wind flowing past the noise reducer 110 is smoother. This facilitates improved noise reduction by the noise reducers 110 and rotor blade assemblies 100 of the present disclosure.

The arrangement of the rods 112, along with their material and size, may further allow the rods 112 to maintain an advantageous alignment during operation of the wind turbine 10. For example, the resulting stiffness of the rods 112 allows for the rods 112 to maintain an alignment that is relatively similar to the stable position alignment even when subjected to operation of the wind turbine 10. Alignment may be with respect to the chord 42 and/or span 44. Thus, the alignment of rods in the operating position may be relatively similar to that in the stable position.

Additionally, the location of a noise reducer 110 with respect to a rotor blade 16 may affect the noise reduction qualities of the noise reducer 110. For example, a noise reducer 110 according to the present disclosure may be located along any suitable portion of the span 44 of the rotor blade 16. In exemplary embodiments, a noise reducer 110 may be located entirely within the outer board area 54. In particular, a noise reducer 110 may be located entirely within approximately 30% of the span 44 of the rotor blade 16 from the tip 32. In other embodiments, however, a noise reducer 110 may be located entirely within approximately 33%, approximately 40%, or approximately 50% of the span 44 of the rotor blade 16 from the tip 32. In still other embodiments, a noise reducer 110 may be located entirely within a suitable portion of the inner board area 52, or within suitable portions of both the inner board area 52 and outer board area 54.

Further, a noise reducer 110 according to the present disclosure may be located on any suitable portion of the rotor blade 16, and may extend beyond the rotor blade 16 by any suitable distance. For example, in exemplary embodiments, each of the plurality of rods 112 in noise reducer 110 may extend beyond the rotor blade 16, such as beyond the trailing edge 28, by between approximately 5% and approximately 15% of the local chord 46 for that rod 112, or by between approximately 10% of the local chord 46 for that rod 112.

A noise reducer 110 according to the present disclosure may in some embodiments further include a mount plate 130. The first end 116 of each rod 112 of a noise reducer 110 may be connected to the mount plate 130, and the mount plate 103 may be mounted to the rotor blade 16, as shown in FIGS. 3 through 6 and 8. The rods 112 and mount plate 130 may be manufactured separately and then connected together, or may be manufactured integrally. For example, in some embodiments, a plate may be provided, and a portion of the plate then sliced into the plurality of rods 112. The remainder of the plate may form the mount plate 130. In other embodiments, as shown in FIG. 7, the plurality of rods 112 of a noise reducer 110, such as the first ends 116 thereof, may be mounted directly to the rotor blade 16, such as in some embodiments between shells defining the pressure side 22 and suction side 24.

It should be understood that noise reducers 110 according to the present disclosure may be connected to rotor blades 16 during the manufacture of the rotor blade 16, or may be retro-fit to existing rotor blades 16, to form rotor blade assemblies 100. It should further be understood that each rod 112 of a noise reducer 110 may have identical characteristics, such as material, size, position, etc., or one or more individual rods 112 or groups of rods 112 may have individual characteristics. For example, in some embodiments, a noise reducer 110 may include a plurality of groups of rods 112, each group including a plurality of rods 112. The rods 112 in each group may have identical characteristics, and one or more of these characteristics may vary from group to group.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly, comprising:
   a rotor blade having exterior surfaces defining a pressure side, a suction side, a leading edge and a trailing edge, each of the pressure side, the suction side, the leading edge and the trailing edge extending between a tip and a root, the rotor blade defining a span and a chord; and,
   a noise reducer configured on the rotor blade, the noise reducer comprising a plurality of rods each having a body extending between a first end and a second end, wherein in a chord-wise direction the first end of each of the plurality of rods is disposed within a boundary defined by the chord and the second end of each of the plurality of rods extends beyond the trailing edge, the body of each of the plurality of rods contacting and extending parallel to the body of a neighboring rod of the plurality of rods when the noise reducer is in a stable position.

2. The rotor blade assembly of claim 1, wherein each of the plurality of rods is formed from a material having a modulus of elasticity of greater than or equal to approximately $2.5 \times 10^3$ N/mm2.

3. The rotor blade assembly of claim 1, wherein each of the plurality of rods is formed from a fiber-reinforced plastic material.

4. The rotor blade assembly of claim 1, wherein a diameter of each of the plurality of rods is less than or equal to approximately 3.0 mm.

5. The rotor blade assembly of claim 1, wherein the noise reducer is located entirely within approximately 30% of the span of the rotor blade from the tip.

6. The rotor blade assembly of claim 1, wherein each of the plurality of rods extends beyond the trailing edge of the rotor blade by between approximately 5% and approximately 15% of a local chord for that rod.

7. The rotor blade assembly of claim 1, wherein each of the plurality of rods is approximately aligned with a local flow direction for the rotor blade.

8. The rotor blade assembly of claim 1, wherein each of the plurality of rods is generally curvilinear.

9. The rotor blade assembly of claim 1, wherein the noise reducer is configured on the trailing edge of the rotor blade.

10. The rotor blade assembly of claim 1, wherein the noise reducer is mounted to the pressure side of the rotor blade.

11. A wind turbine, comprising:
a plurality of rotor blades each having exterior surfaces defining a pressure side, a suction side, a leading edge and a trailing edge, each of the pressure side, the suction side, the leading edge and the trailing edge extending between a tip and a root, each of the plurality of rotor blades defining a span and a chord; and,
a noise reducer configured on at least one of the plurality of rotor blades, the noise reducer comprising a plurality of rods each having a body extending between a first end and a second end, wherein in a chord-wise direction the first end of each of the plurality of rods is disposed within a boundary defined by the chord and the second end of each of the plurality of rods extends beyond the trailing edge, the body of each of the plurality of rods contacting and extending parallel to the body of a neighboring rod of the plurality of rods when the noise reducer is in a stable position.

12. The wind turbine of claim 11, wherein each of the plurality of rods is formed from a material having a modulus of elasticity of greater than or equal to approximately $2.5 \times 10^3$ N/mm².

13. The wind turbine of claim 11, wherein each of the plurality of rods is formed from a fiber-reinforced plastic material.

14. The wind turbine of claim 11, wherein a diameter of each of the plurality of rods is less than or equal to approximately 3.0 mm.

15. The wind turbine of claim 11, wherein the noise reducer is located entirely within approximately 30% of the span of the rotor blade from the tip.

16. The wind turbine of claim 11, wherein each of the plurality of rods extends beyond the trailing edge of the rotor blade by between approximately 5% and approximately 15% of a local chord for that rod.

17. The wind turbine of claim 11, wherein each of the plurality of rods is approximately aligned with a local flow direction for the rotor blade.

* * * * *